(12) United States Patent
Young et al.

(10) Patent No.: US 8,232,502 B2
(45) Date of Patent: Jul. 31, 2012

(54) LASER ENGRAVING OF CERAMIC ARTICLES

(75) Inventors: Michael Joseph Young, Burleson, TX (US); Christopher Emmanuel Marzano, Tulsa, OK (US)

(73) Assignee: Acme Services Company, LLP, Fort Worth, TX (US)

( * ) Notice: Subject to any disclaimer, the term of this patent is extended or adjusted under 35 U.S.C. 154(b) by 964 days.

(21) Appl. No.: 12/168,967

(22) Filed: Jul. 8, 2008

(65) Prior Publication Data
US 2010/0006546 A1 Jan. 14, 2010

(51) Int. Cl.
*B23K 26/36* (2006.01)
(52) U.S. Cl. ............ 219/121.69; 264/400; 264/482
(58) Field of Classification Search ............ 219/121.68, 219/121.69, 121.85; 264/400, 482; 428/542.2
See application file for complete search history.

(56) References Cited

U.S. PATENT DOCUMENTS

| | | | |
|---|---|---|---|
| 3,747,117 A | 7/1973 | Fechter | |
| 4,476,154 A | 10/1984 | Iesaka et al. | |
| 4,476,310 A | 10/1984 | Honda et al. | |
| 4,769,310 A | 9/1988 | Gugger et al. | |
| 4,857,699 A | 8/1989 | Duley et al. | |
| 4,997,468 A | 3/1991 | Dimitrov et al. | |
| 5,030,551 A | 7/1991 | Herren et al. | |
| 5,198,637 A | 3/1993 | Noda et al. | |
| 5,298,717 A | 3/1994 | DeRossett, Jr. | |
| 5,397,686 A | 3/1995 | Dominick et al. | |
| 5,416,298 A | 5/1995 | Robert et al. | |
| 5,427,825 A | 6/1995 | Murnick | |
| 5,454,881 A * | 10/1995 | Fischer | 148/241 |
| 5,473,138 A | 12/1995 | Singh et al. | |
| 5,554,335 A | 9/1996 | Fields et al. | |
| 5,673,532 A | 10/1997 | Jennings et al. | |
| 6,064,034 A | 5/2000 | Rieck | |
| 6,132,818 A | 10/2000 | Tanaka et al. | |
| 6,313,433 B1 | 11/2001 | Sukman et al. | |
| 6,331,691 B1 | 12/2001 | DePrisco et al. | |
| 6,417,481 B2 | 7/2002 | Chen et al. | |
| 6,586,702 B2 | 7/2003 | Wiener-Avnear et al. | |
| 6,635,846 B1 | 10/2003 | Rieck | |
| 6,822,192 B1 | 11/2004 | Young | |
| 6,856,316 B1 * | 2/2005 | Browne et al. | 345/467 |
| 2003/0201258 A1 * | 10/2003 | De Steur et al. | 219/121.69 |
| 2004/0137201 A1 * | 7/2004 | Hannan et al. | 428/172 |
| 2009/0056801 A1 * | 3/2009 | Chun-Hsiung et al. | 136/256 |

FOREIGN PATENT DOCUMENTS

| | | |
|---|---|---|
| EP | 0369057 | 5/1990 |
| JP | 07116869 | 5/1995 |
| JP | 407269130 | 10/1995 |
| WO | WO-95/35269 | 12/1995 |

* cited by examiner

*Primary Examiner* — Samuel M Heinrich
(74) *Attorney, Agent, or Firm* — Gardere Wynne Sewell, LLP

(57) ABSTRACT

A method for engraving an image on a surface of an article selected from a group consisting of brick, ceramic tile, concrete pavers and natural stone articles, comprising providing a laser engraving apparatus comprising a steerable laser beam, steering the laser beam continuously over a first beam path on the surface to provide an engraved image and repeatedly traversing the laser beam over a path substantially parallel to the first beam path and incrementally spaced therefrom to define a perimeter of the engraved image. The method further comprises steering the laser beam within an infill area defined by the perimeter of the engraved image to provide a plurality of engraved segments extending within infill area.

21 Claims, 6 Drawing Sheets

LASER ENGRAVING OF CERAMIC ARTICLES

BACKGROUND OF THE INVENTION

Ceramic articles, such as tile, concrete, plaster, refractory articles and brick are difficult to engrave in a manner which produces an aesthetically pleasing and highly visible product. Because the compositions of ceramic articles do not lend themselves to precise engraving methods, production rates can be relatively low and/or the size of the engravings are forced to be relatively small. Efforts have been made to provide engraved brick utilizing laser beams and expensive, specialized laser beam generating equipment; however, these efforts have produced results which are not always aesthetically suitable, are highly reflective and as such, difficult to identify, are limited in size, and result in low production rates.

SUMMARY OF THE INVENTION

Embodiments of the present invention provide a method for engraving an image on a surface of an article selected from a group consisting of brick, ceramic tile, concrete pavers and natural stone articles. The method comprises providing a laser engraving apparatus comprising a steerable laser beam and steering the laser beam continuously over a first beam path on the surface to provide an engraved image. The method continues by repeatedly traversing the laser beam over a path substantially parallel to the first beam path and incrementally spaced therefrom to define a perimeter of the engraved image. The method further comprises steering the laser beam within an infill area defined by the perimeter of the engraved image to provide a plurality of spaced apart and parallel engraved segments extending within the infill area. According to some embodiments, the spaced apart engraved segments comprise a series of sections separated by gaps, the sections/gaps being staggered and/or otherwise offset from sections/gaps on adjacently positioned engraved segments. Such method provides a highly visible engraved image for use in applications such as, for example, traffic signage, increases the speed at which the engraving can occur thereby increasing the overall production rate, and substantially eliminates or reduces the reflective effect from the engraved image. For example, in applications requiring high visibility, such as in connection with identifying fire lanes, a large format font can be engraved at high production rates for providing high visibility indications.

Those skilled in the art will further appreciate the above-mentioned advantages and superior features of the invention upon reading the detailed description which follows in conjunction with the drawings.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
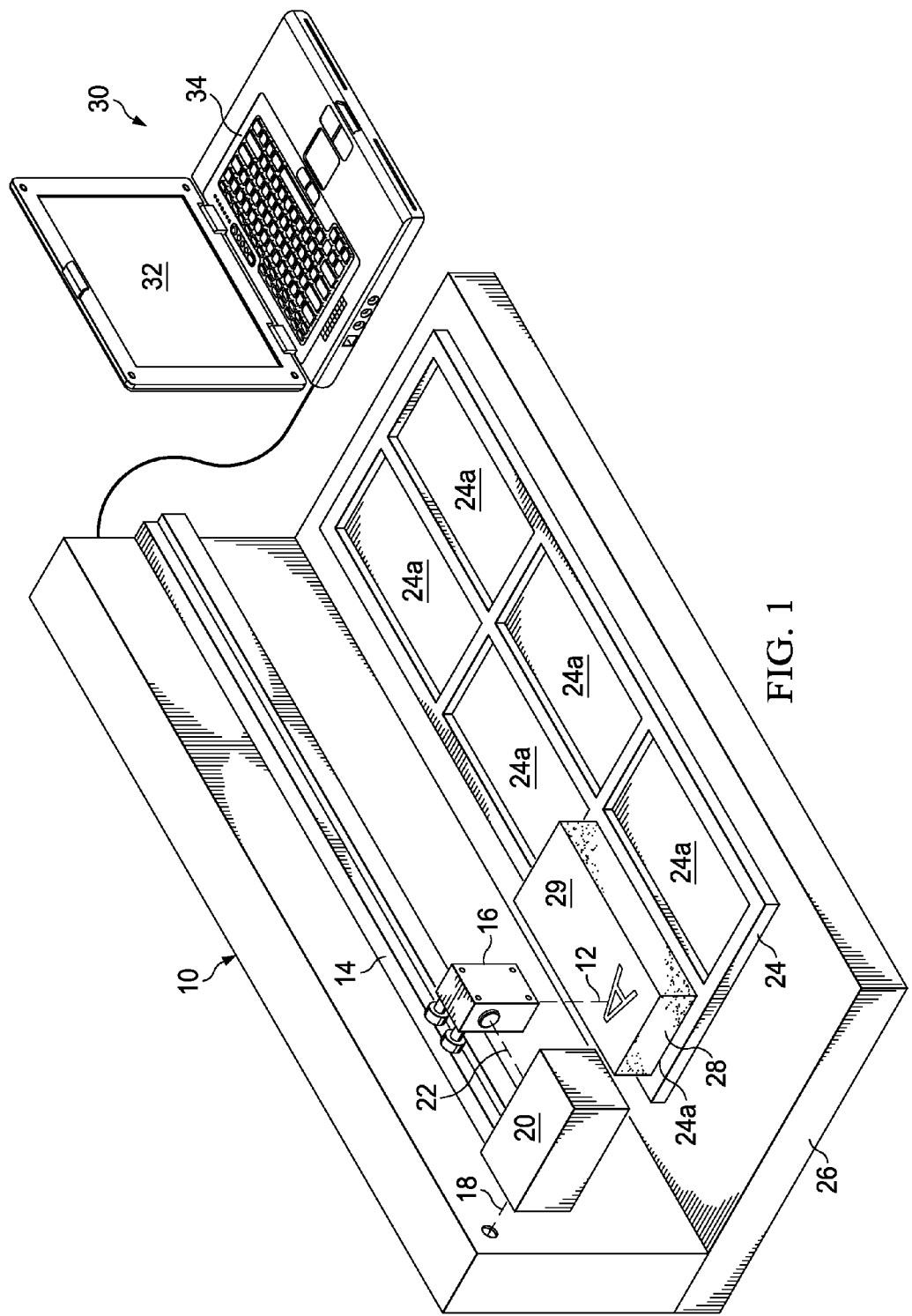
FIG. 1 is a perspective view of a laser engraving system for carrying out a laser engraving process.

In the description which follows like parts are marked throughout the specification and drawings with the same reference numerals, respectively. The drawing figures may not be to scale and certain features may be shown exaggerated in scale or in somewhat schematic form in the interest of clarity and conciseness.

Figure 2:
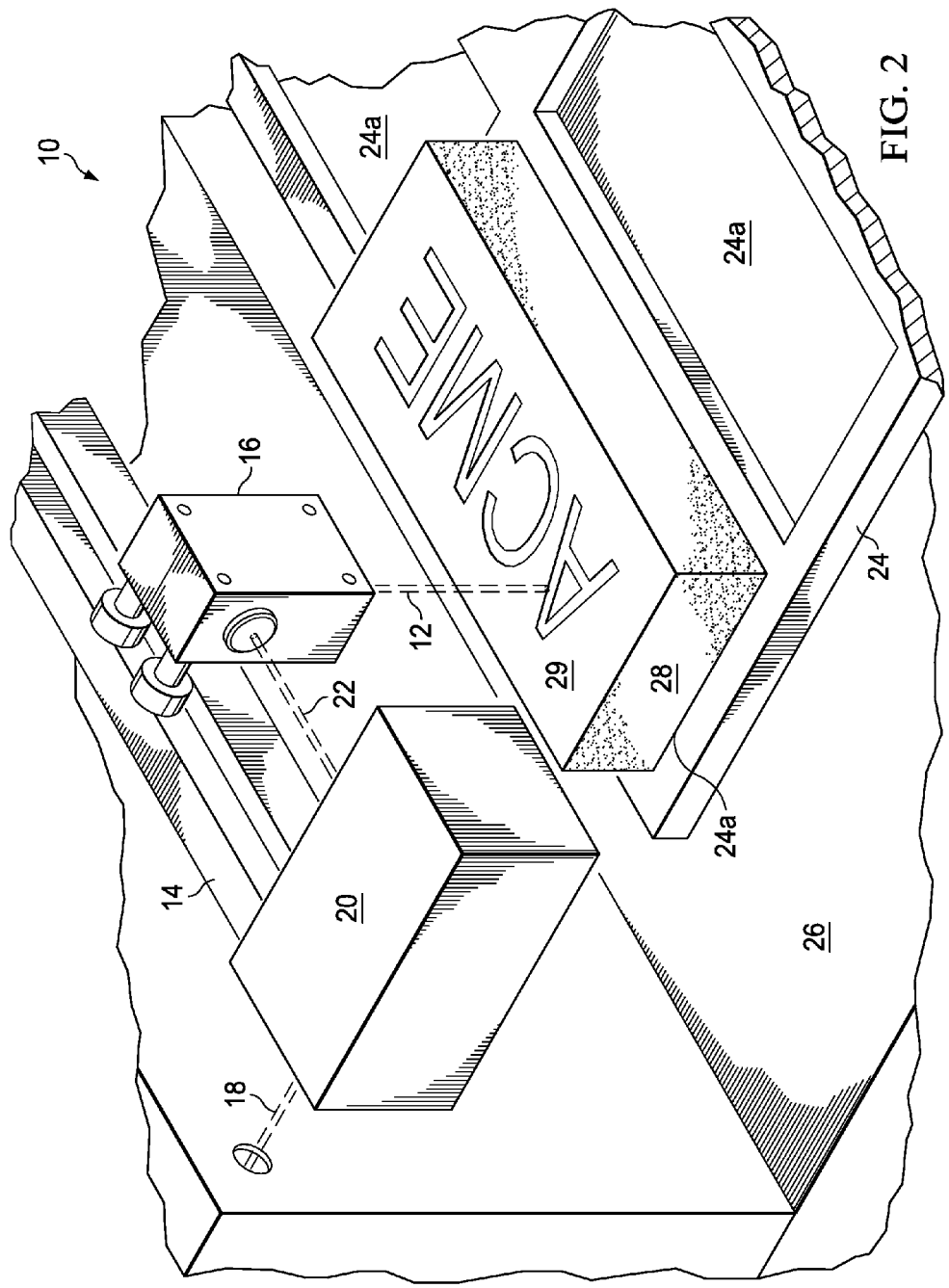
FIG. 2 is a detail perspective view of a portion of the system of FIG. 1 on a larger scale.

FIGS. 1 and 2 are diagrams illustrating a laser engraving apparatus 10 for carrying out a laser engraving process in which ceramic objects, such as, but not limited to, brick, tile, cement, plaster, and other natural stone articles, can be engraved to produce large and highly visible images at high production rates. The laser engraving apparatus 10 may be of a type available from Universal Laser Systems, Inc., Scottsdale, Ariz., as their Model X2-660 Laser Engraving System; however, it should be understood that other models from other manufacturers may also be utilized for carrying out the present laser engraving process. Laser engraving system 10 is operable at room temperature and ambient atmospheric pressure conditions and, preferably, uses two sixty watt $CO_2$ laser tubes generating one hundred twenty watts power total. In the embodiment illustrated in FIG. 1, laser engraving system 10 utilizes a flying mirror arrangement or mechanism to manipulate a continuous laser output beam 12 whereby an elongated rail 14 supports a flying mirror and lens device 16 for movement along an X axis, and the device 16 is movable along a Y axis by suitable apparatus (not illustrated). A laser beam is generated by apparatus 10 and projects along a path 18 to a mirror apparatus 20 whereupon the beam is re-directed along a path 22 to device 16 and then re-directed downwardly to form beam 12. Typically, the beam projected along paths 18 and 22 is about 0.13 inches in diameter and is projected through a lens, not shown, mounted within the device 16 having a fixed focal length. In the embodiment illustrated in FIG. 1, the fixed focal length is approximately 4.0 inches; however, it should be understood that other lengths are also appropriate. According to some embodiments, the beam is reduced to a diameter, preferably, not less than about 0.013 inches for beam 12. Accordingly, such arrangement does not require a collimator and provides a beam intensity of about $1.333 \times 10^5$ watts/$cm^2$.

In the embodiment illustrated in FIGS. 1 and 2, apparatus 10 comprises a workpiece locating template 24 releasably secured on a work surface 26. In FIGS. 1 and 2, template 24 includes plural recesses 24a formed therein for receiving and locating one or more conventional construction bricks 28. Accordingly, apparatus 10, having its own processor for controlling movement of beam 12, operates to engrave plural bricks 28, one shown in a continuous production operation before requiring that a new set of one or more bricks be inserted in the receptacles 24a and a new cycle of engraving carried out. In the embodiment illustrated in FIGS. 1 and 2, one brick 28 is disposed in template 24; however, those skilled in the art will recognize that each of the receptacles 24a may have a brick placed therein and the engraving process carried out on each brick before requiring that the bricks be removed and replaced by a new set of bricks or similar articles to which engraving is to be applied.

In the embodiment illustrated in FIGS. 1 and 2, the processor associated with the apparatus 10 may receive instructions from a second commercially available processor utilizing a commercially available computer program which may be used to align the text of the engraving, such as the word "ACME" as shown in FIG. 2, as well as any other text or graphics for proper placement on surface 29 of brick 28. For example, the text may be aligned to the left side, right side and center of a particular brick with selected spacing between each line of text, and the text may be outlined in a particularly chosen color, and wherein the color denotes a power setting of the laser of the apparatus 10. This process is carried out on the processor 30, which includes a video display or monitor 32 and a keyboard 34. A preferred computer program for generating graphics or text to be engraved on the brick 28, for example, is commercially available under the trademark "CorelDRAW" available from Corel, Inc., Dallas, Tex. In the embodiment illustrated in FIGS. 1 and 2, each image or character, such as the letters "A", "C", "M" and "E" or any other graphic representation, is at least partially engraved using a vector mode of operation, an example of which is described in U.S. Pat. No. 6,822,192, assigned to the assignee of the present invention, the disclosure of which is incorporated by reference herein.

Figure 4:
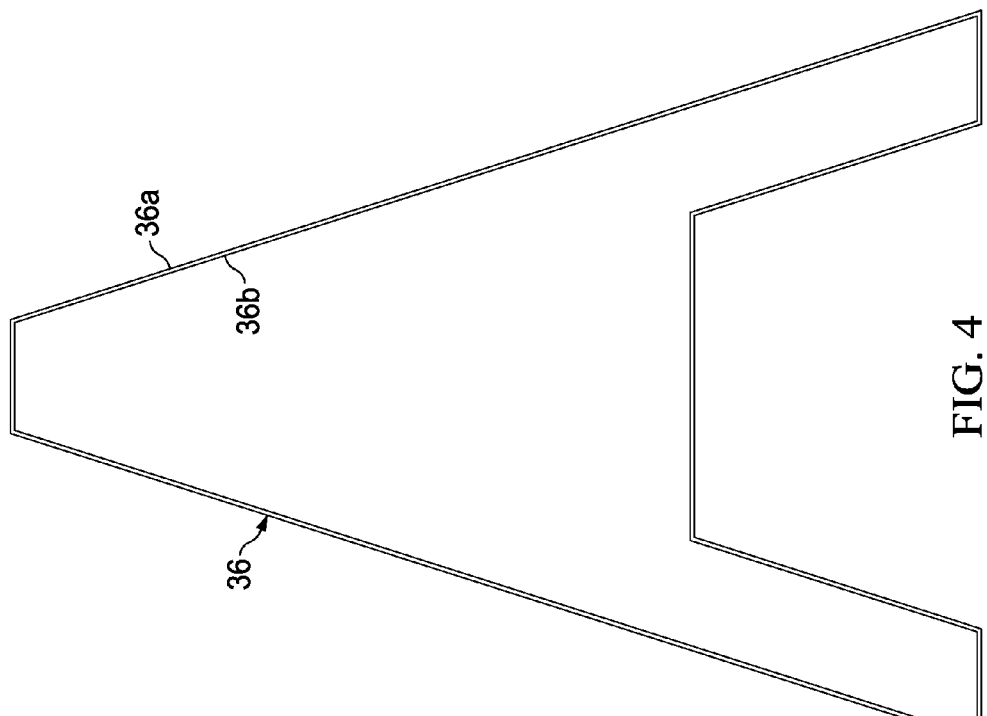
FIGS. 3-7 are schematic diagrams showing the path or pattern of the laser beam in accordance with the method to engrave a particular graphic or character.
Figure 3:
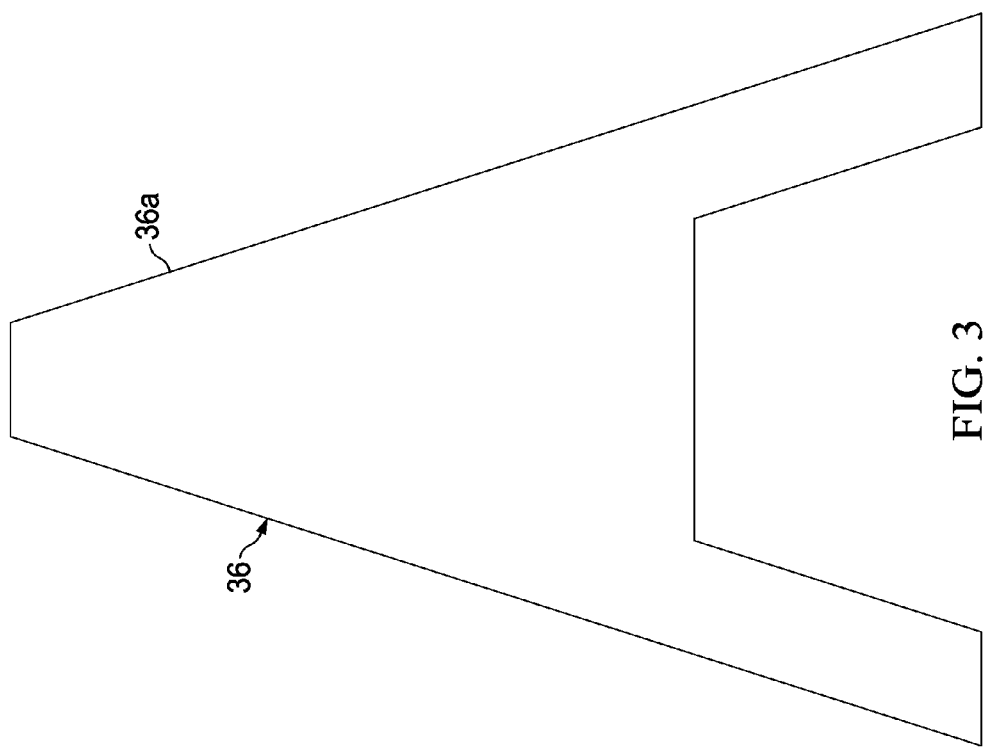
Figure 5:
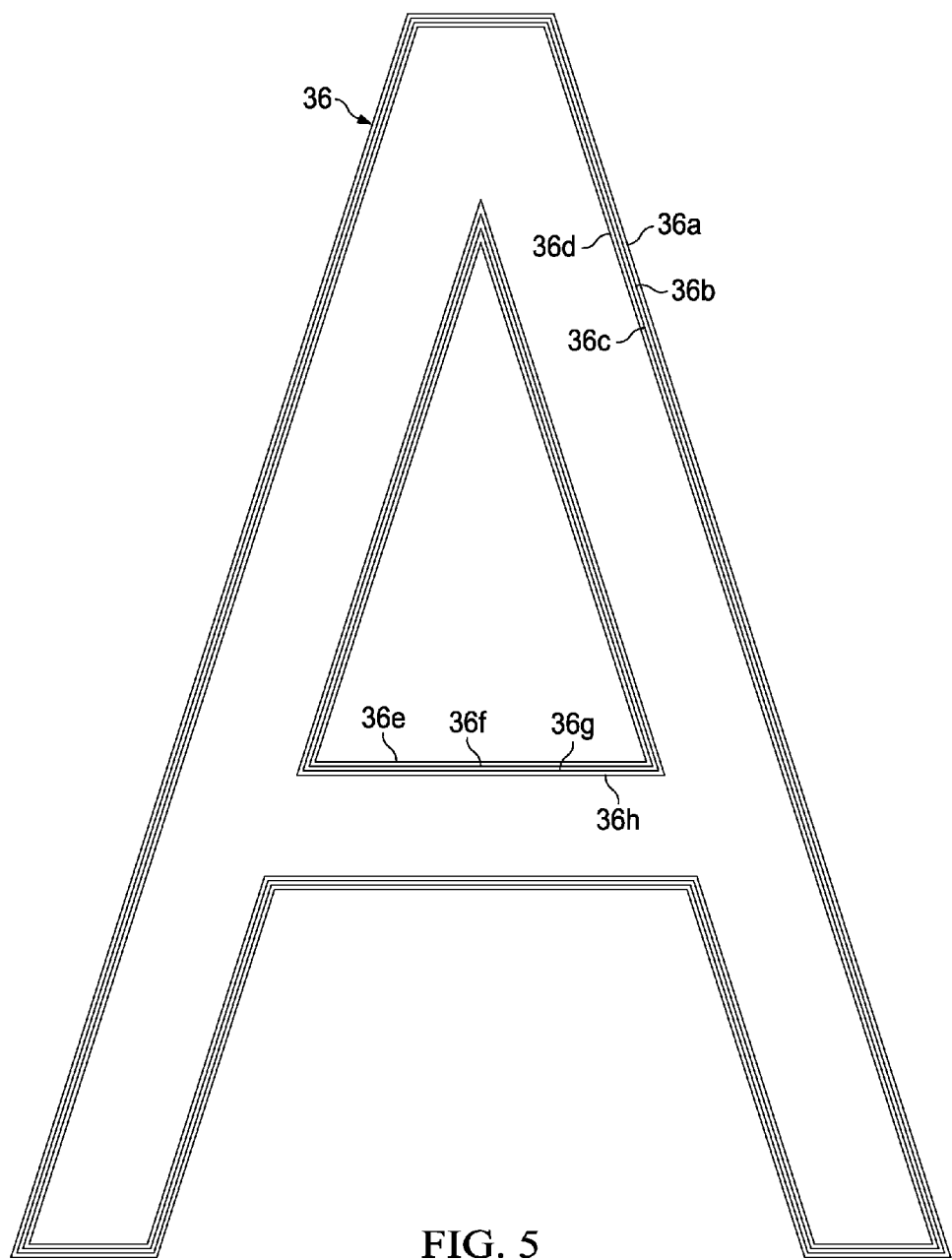

FIGS. 3-7 are diagrams illustrating the path of the laser beam in accordance with an engraving method. Referring specifically to FIG. 3, for example, an image or graphic of the letter A, indicated by reference numeral 36, is engraved on brick 28 (FIG. 1) by causing laser beam 12 to follow an overall outline of the letter, as indicated by path 36a. It should be understood that path 36a varies depending on the shape of the engraved image. After defining an image outline, the beam 12 is traversed repeatedly along an outline of graphic 36 at incrementally changed and preferably reduced path dimensions whereby the laser beam 12 may follow a continuous path 36b, for example, as illustrated in FIG. 4. This process may be repeated at incrementally reduced dimensions wherein a continuous, in many instances, unbroken path may be traced by the beam 12. In FIG. 5, third and fourth incrementally spaced and reduced length, continuous beam paths 36c and 36d are followed by the laser beam 12, also tracing an outline generally parallel to path 36b to carry out the engraving process of graphic 36. Furthermore, beam 12 is moved along beam paths 36e-36h to engrave the interior portion of the letter "A", as illustrated in FIG. 5. It should be understood that beam paths 36a-36h may be traced in any order. For example, according to one embodiment, beam paths 36e-36h are traced by beam 12 prior to tracing beam paths 36a-36d. According to some embodiments, beam 12 is incrementally moved and indexed laterally a distance slightly less than the beam width for each pass; however, it should be understood that such distances may vary.

In the embodiment illustrated in FIGS. 3-7, four continuous paths (e.g., beam paths 36a, 36b, 36c and 36d and beam paths 36e, 36f, 36g and 36h) define and/or otherwise establish an outline or perimeter 38 of graphic 36 and define an infill area 40. However, it should be understood that a greater or fewer number of beam paths may be utilized to establish the outline or perimeter 38 of graphic 36. This process may also be defined as a vector mode of operation of apparatus 10.

Figure 6:
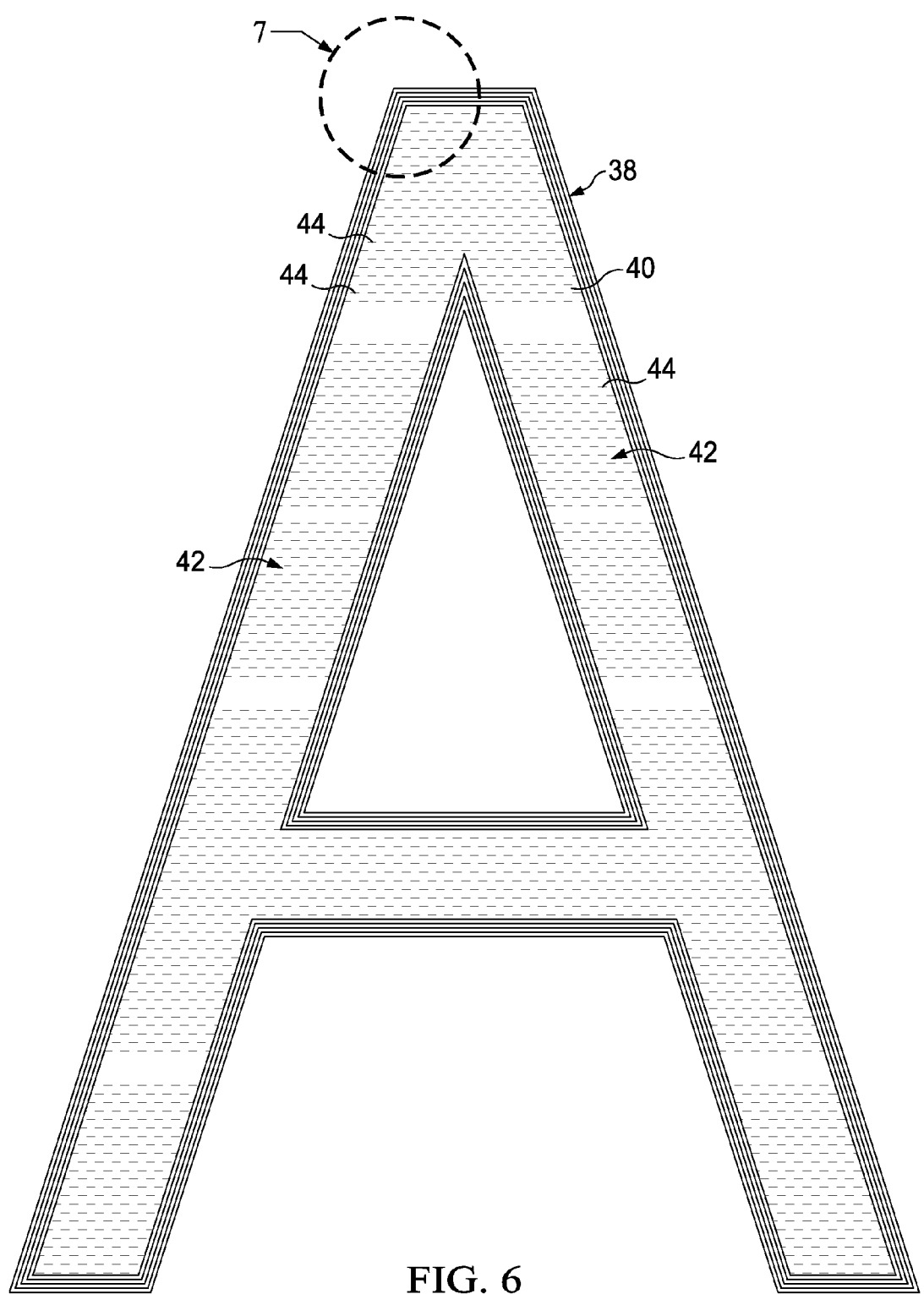
Figure 7:
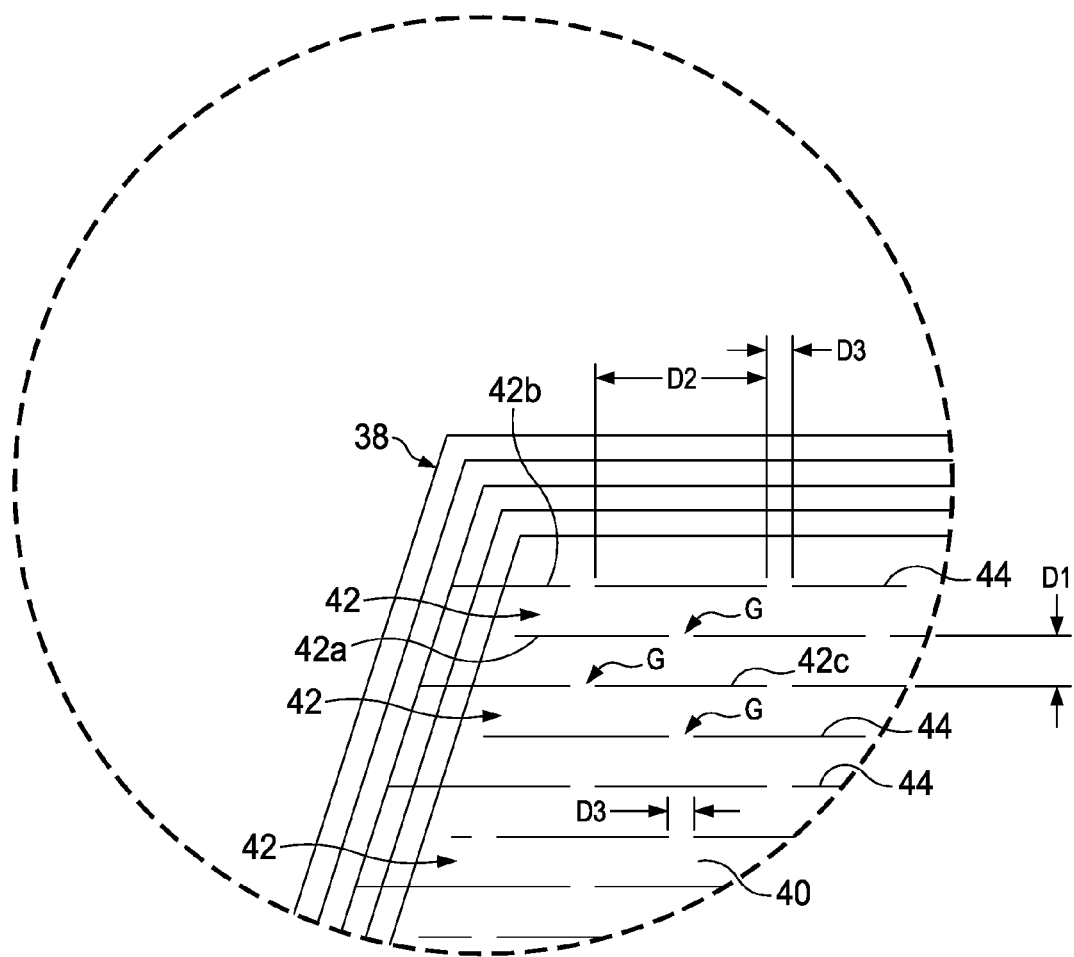

FIGS. 6 and 7 are diagrams illustrating infill area 40. In the embodiment illustrated in FIGS. 6 and 7, infill area 40 is defined by perimeter 38 and is engraved by laser 12 to produce a plurality of spaced apart engraved segments 42, which extend horizontally across infill area 40. In the embodiment illustrated in FIGS. 6 and 7, engraved segments 42 are positioned in parallel relation with respect to each other. It should be understood, however, that engraved segments 42 may be otherwise configured, such as, for example, in a non-parallel relationship, in a vertical orientation, an angled orientation, or any combination thereof. According to some embodiments, engraved segments 42 are spaced apart a distance D1 (FIG. 7). In the embodiment illustrated in FIGS. 6 and 7, D1 is approximately 0.020 inches; however, it should be understood that distance D1 may vary.

Referring specifically to FIG. 7, each engraved segment 42 comprises spaced apart gaps G defining engraved sections 44. In the embodiment illustrated in FIG. 7, sections 44 extend a distance D2 and are spaced apart by gaps G a distance D3. According to some embodiments, D2 is approximately 0.125 inches and D3 is approximately 0.015 inches; however, it should be understood that distances D2 and D3 may vary.

In the embodiment illustrated in FIGS. 6 and 7, sections 44 on each engraved segment 42 are offset from sections 44 on adjacently positioned engraved segments 42 to provide high visibility of graphic 36. For example, referring to FIG. 7, sections 44 of engraved segment 42a are generally aligned with gaps G of adjacently positioned engraved segment 42b and 42c.

According to some embodiments, infill area 40 is engraved utilizing a single pass and completely fills each graphic 36 prior to engraving an adjacently positioned graphic. For example, in the embodiment illustrated in FIG. 1, infill area 40 of the letter "A" is completely engraved with engraved segments 42 via a single pass of laser beam 12 over infill area 40 prior to engraving the next adjacently positioned character or graphic 36. According to some embodiments, at least some engraved segments 42 may be engraved as a continuous segment (e.g., without gaps G).

As described above, beam 12 may make one complete pass, that is, plural closed circuit traces to form a certain depth of cut for perimeter 38, then repeat the same process on the same image to obtain the final desired depth of the cut. According to some embodiments, beam 12 may be steered to engrave infill area 40 after completing the second pass of perimeter 28; however, it should be understood that infill area may be engraved prior to the first pass cutting perimeter 28 or in between the first and second pass of perimeter 28. In the embodiment illustrated in FIGS. 6 and 7, infill area 40 may be engraved utilizing a single pass of beam 12; however, it should be understood that multiple passes may be used if desired. After engraving perimeter 38 and infill area 40, beam 12 may then proceed to the next image such as the letter "C" for brick 28 (FIG. 3), and so on. Alternatively, beam 12 may be controlled to make one pass on each image on each brick and then repeat the same process on a second pass on each image on each brick to complete the full depth of "cut" of the engraved image.

In the embodiment illustrated in FIGS. 3-7, the combination of perimeter 38 and segments 42 enable graphic 36 to be highly visible and produced at increased production rates. For example, the combination of continuous paths 36a-36h forming perimeter 38 and the staggered relationship of engraved sections 44 provide high visibility and clarity of graphic 36. Accordingly, graphic 36 may be used in applications and/or signing requiring high visibility, such as, but not limited to, indicating fire lanes for the fire department, general traffic indicators for pedestrian and/or automobile traffic, or any other application such as those traditionally indicated with paint or the like. According to some embodiments, graphic 36 can be as engraved so as to have a height of at least one inch for increased visibility. Furthermore, large graphics can be produced at high production rates since a smaller surface area of the ceramic article is engraved and only a single pass is required for infill area 40. For example, by utilizing a limited number of beam paths 36a-36h to form perimeter 38 and incorporating gaps G within segments 42, less surface area is engraved thereby increasing the overall speed that graphic 36 may be created.

The above described process of engraving a brick or similar article, such as the brick 28, is carried out by the processor of the apparatus 10 upon the sending of suitable instructions thereto from the processor 30. These steps are similar in nature to those wherein a document generated on the processor 30 would be sent to a computer printer. This avoids the requirements for a so-called CNC (computer numerically controlled) system or an MMI (man to machine interface) type of system.

Utilizing the CorelDRAW computer program and apparatus 10, the power output and speed of movement of the laser beam across the surface 29 may be selected, by filling in a certain color on the graphic image generated on monitor 32, for example. Selecting a particular color provides a corresponding signal to apparatus 10, which controls the power output and speed of movement of the beam 12. For engraving bricks of the type described herein, it has been determined that a beam speed in the range of about 120 mm/sec to as much as 1000 mm/sec at one hundred percent power output of the laser is desirable to produce a quality cut or engraving. In particular, a beam speed of about 250 mm/sec may be more desirable. Bricks, such as brick 28 or similar articles, may be engraved at conventional room temperature with a $CO_2$ laser of the type associated with apparatus 10, using one and preferably two passes of the beam over the entire surface of the engraved image, such as graphic 36 representing the letter "A".

Although preferred embodiments of the invention have been described in detail, those skilled in the art will also recognize that various substitutions and modifications may be made without departing from the scope and spirit of the appended claims.

What is claimed is:

1. A method for engraving an image on a surface of an article selected from a group consisting of brick, ceramic tile, concrete pavers and natural stone articles, the method comprising:
   providing a laser engraving apparatus comprising a steerable laser beam;
   steering the laser beam continuously over a first beam path on the surface to provide an engraved image and repeatedly traversing the laser beam continuously over a path substantially parallel to the first beam path and incrementally spaced therefrom to define a perimeter of the engraved image; and
   steering the laser beam within an infill area defined by the perimeter of the engraved image to provide a plurality of engraved segments extending within the infill area, the plurality of engraved segments being spaced apart and substantially equidistant from each other.

2. The method set forth in claim 1, further comprising steering the laser beam within the infill area to provide engraved segments that are selected from the group consisting of horizontal, vertical, angled and combinations thereof.

3. The method set forth in claim 1, wherein providing the plurality of engraved segments comprises providing a plurality of spaced apart gaps within the plurality of engraved segments to form spaced apart engraved sections.

4. The method set forth in claim 3, further comprising providing the plurality of spaced apart gaps approximately a length of 0.015 inches.

5. The method set for the in claim 3, further comprising forming the spaced apart engraved sections a length of 0.125 inches.

6. The method set forth in claim 3, further comprising offsetting the spaced apart gaps within an engraved segment from the spaced apart gaps within an adjacently positioned engraved segment.

7. The method set forth in claim 1, further comprising spacing the engraved segments about 0.020 inches apart.

8. The method set forth in claim 3, further comprising aligning the spaced apart gaps of a first engraved segment with an engraved section of an adjacent engraved segment.

9. The method set forth in claim 1, further comprising steering the laser beam such that the image comprises a height of at least 1 inch.

10. A method for engraving an image on a surface of an article selected from a group consisting of brick, ceramic tile, concrete pavers and natural stone articles, the method comprising:
    providing a laser engraving apparatus comprising a steerable laser beam;
    steering the laser beam continuously over a first beam path on the surface to provide a perimeter of an engraved image; and
    steering the laser beam within an interior area defined by the perimeter of the engraved image to engrave in a single pass a plurality of spaced apart segments to fill the interior area.

11. The method of claim 10, further comprising repeatedly traversing the laser beam over a path substantially parallel to the first beam path and incrementally spaced therefrom to define the perimeter of the engraved image.

12. The method of claim 10, further comprising steering the laser beam within the infill area to provide a plurality of parallel segments.

13. The method of claim 10, wherein providing the plurality of segments comprises providing a plurality of spaced apart gaps within the plurality of segments to form spaced apart engraved sections.

14. The method of claim 13, further comprising providing the plurality of spaced apart gaps approximately a length of approximately 0.015 inches.

15. The method of claim 13, further comprising forming the spaced apart engraved sections a length of approximately 0.125 inches.

16. The method of claim 13, further comprising offsetting the spaced apart gaps within a segment from the spaced apart gaps within an adjacently positioned segment.

17. The method of claim 13, further comprising spacing the parallel segments about 0.020 inches apart.

18. A method for engraving a surface of an article selected from a group consisting of brick, ceramic tile, concrete pavers and natural stone articles, the method comprising:
    (a) providing an apparatus comprising a laser generating a steerable laser beam operable to be continuously moved over a first continuous predetermined beam path on the surface of the article to provide a perimeter of an engraved image;
    (b) traversing said laser beam over a path substantially parallel to said first beam path, incrementally spaced therefrom and of incrementally reduced path length, a sufficient number of times to define the outline of the first engraved image;
    (c) causing the laser beam to be traversed over a second beam path within the perimeter of the engraved image, the second beam path comprising a plurality of spaced apart engraved segments having gaps therebetween; and
    (d) repeating steps (b), and (c) on another article to provide the image on the article.

19. The method of claim 18, wherein traversing the laser beam over a second beam path comprises steering the last beam to provide a plurality of parallel spaced apart engraved segments.

20. The method of claim 18, further comprising providing a plurality of equidistant spaced apart gaps within the spaced apart engraved segments to form spaced apart engraved sections.

21. The method of claim 18, wherein the gaps are a length of approximately 0.015 inches.

* * * * *